June 5, 1934. W. S. HARLEY ET AL 1,961,145
MOTORCYCLE SADDLE STRUCTURE
Filed June 30, 1932
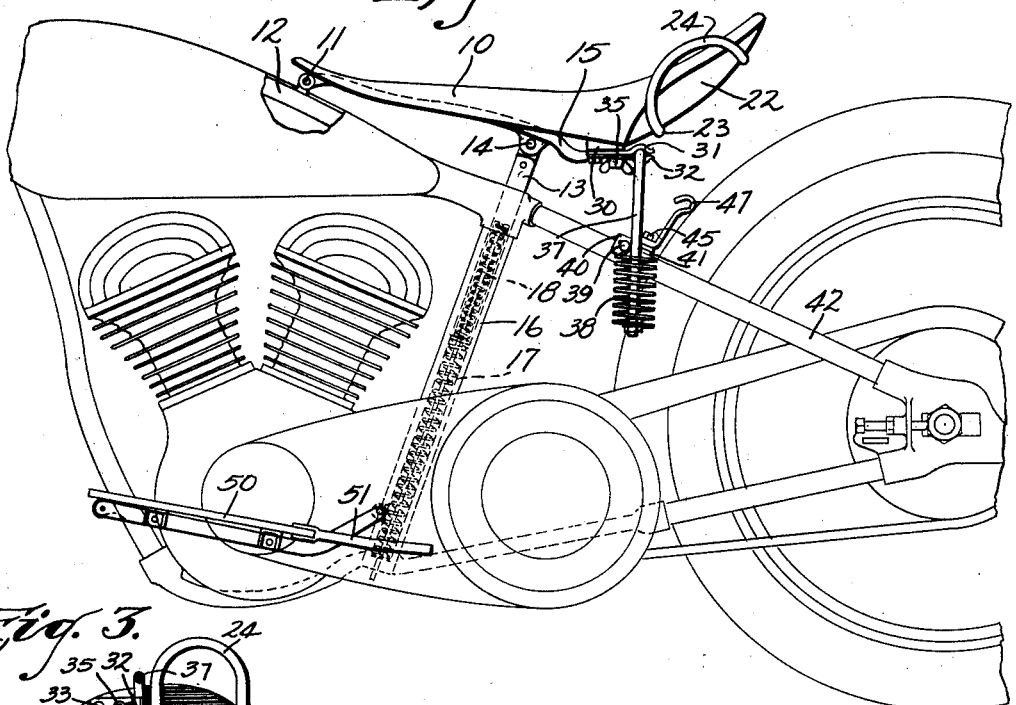
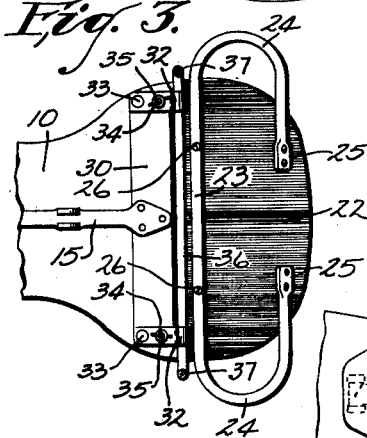
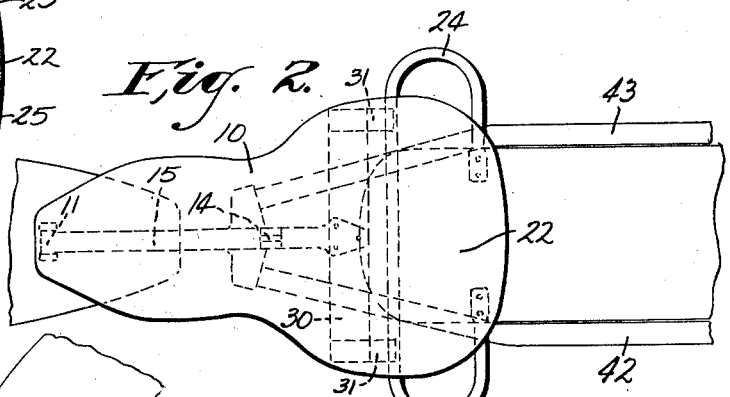
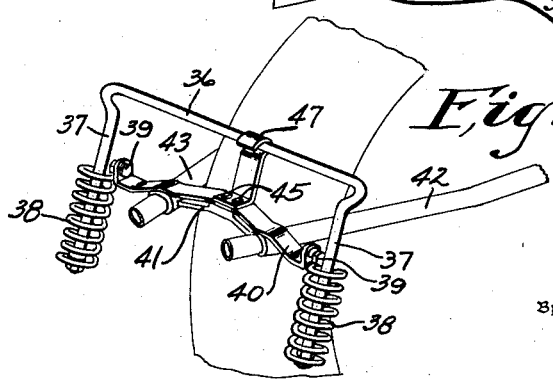
Inventors
William S. Harley and
Frank W. Trispel
By Wheler, Wheler and Wheler
Attorneys Patented June 5, 1934

1,961,145

UNITED STATES PATENT OFFICE 1,961,145

MOTORCYCLE SADDLE STRUCTURE

William S. Harley and Frank W. Trispel, Milwaukee, Wis., assignors to Harley-Davidson Motor Company, Milwaukee, Wis., a corporation of Wisconsin Application June 30, 1932, Serial No. 620,152

16 Claims. (Cl. 208—100)

Our invention relates to improvements in motorcycle saddle structures.

Our object is to provide means whereby a motorcycle saddle may be adapted for carrying widely variant loads without subjecting its springs to overloads or providing unduly rigid supports for light loads.

More particularly stated, our object is to provide a motorcycle with an oversized or elongated saddle upon which one or more persons may be seated, and to provide such a saddle with disengageable auxiliary and resiliently yielding supporting means which may be connected with the motorcycle frame in either a saddle supporting position or in a position of non-use; said saddle being adapted to allow the operator to normally occupy a position directly over the normal support for the saddle, and to also allow the operator to move forwardly from such a position and allow a passenger to be comfortably seated upon the rear portion of the saddle when the auxiliary supporting means is connected in supporting relation to such portion.

Further and more specific objects of our invention are to provide means whereby auxiliary resilient seat supports for motorcycles may be disengaged from a saddle and firmly secured in a position of non-use without detachment from the motorcycle frame; to provide convenient means for attaching such supports to a motorcycle frame; to provide means for utilizing the resilience of such supports to hold them in anti-rattling relation to the frame when not in use as auxiliary saddle supports; to provide an oversized motorcycle saddle with suitable hand grips for the person seated at the rear, said hand grips being also adapted to facilitate utilization of the rear portion of the seat for carrying baggage when only one person occupies the saddle; and in general to provide means whereby a motorcycle saddle may carry excess loads without overloading the saddle supporting springs.

In the drawing:

Figure 1 is a fragmentary view of a motorcycle equipped with a saddle structure embodying our invention.

Figure 2 is a plan view of the improved saddle and portions of associated parts of a motorcycle frame.

Figure 3 is a view of the rear portion of the saddle as seen from the under side.

Figure 4 is a perspective view of the auxiliary saddle supporting yoke with associated mounting bar, springs and retaining hook, and also showing fragments of the upper frame fork and mud guard.

Like parts are identified by the same reference characters throughout the several views.

The motorcycle frame illustrated in the drawing may be assumed to be of ordinary construction. The saddle 10 is similar in form and structure to saddles in ordinary use, except that it is elongated sufficiently to permit more than one person to conveniently occupy it.

The hinged connection 11 between the saddle horn and the upper frame bar 12, the saddle post 13, its pivotal connection at 14 with the pillar bar 15 or frame of the saddle, the seat post tube or tubular frame strut 16 and the springs 17 and 18 socketed therein and adapted respectively to support the saddle post and absorb rebounds,— may all be of ordinary construction, and detailed illustration and description of these parts is therefore deemed to be unnecessary.

The obliquely upturned rear portion 22 of the saddle 10 has attached thereto a cross rod 23, the end portions of which are upturned and reversely bent to form upwardly and laterally offset hand grips 24. The extremities of the rod 23 are inturned and secured to the base plate of the portion 22 near its upper margin as best shown at 25 and 26 in Figure 3.

To provide a resiliently yielding auxiliary support for the rear portion of the saddle we equip the saddle cross bar 30 with sets of clamping plates 31 and 32, each pair of clamping plates being connected with one end of the bar 30 by bolts 33—34, thumb nuts 35 being employed to adjust the clamping plates into clamping relation with the cross piece 36 of a yoke-shaped supporting rod which has its side arms 37 extending through coiled springs 38 and connected with the lower ends of the springs, said springs having their upper ends secured by bolts 39 to the up-turned ends of a mounting plate 40. The central portion of the mounting plate 40 is bolted to a cross brace 41 connecting the arms 42 and 43 of the upper rearwardly extending frame fork of the motorcycle. The mounting plate preferably bears upon the ends of the cross brace 41 and extends laterally on each side of the frame fork, whereby the springs may be suspended from the extremities of the plate 40 in positions laterally offset from the fork. The bolts 45 which connect the mounting plate to the cross brace 41 are also utilized to connect thereto a hook 47 within which the yoke bar 36 may be engaged when the yoke is not used as a saddle support.

The springs 38 are under tension sufficient to furnish the required additional support to the saddle when the yoke is engaged by the connecting clamping members 31 and 32. But preferably an additional distension of the springs 38 will be required when the yoke is disengaged from the saddle and its cross bar 36 engaged in the hook 47, the springs being then effective to hold the yoke to the hook in anti-rattling relation thereto.

It will be observed that the saddle cross bar 30 is located at the rear end of the pillar bar 15 and at a substantial distance to the rear of the pivot pin 14 connecting the saddle with the saddle post 13. The auxiliary spring supported yoke is connected with the saddle by the clamping members 31—32 along a line immediately at the rear of the cross bar 30. The yoke is therefore in a position to support the added weight of a person seated upon the saddle, back of the driver, and the saddle post and its supporting spring are thus relieved of excess load. It will, of course, be understood that the auxiliary support thus provided by the yoke and its supporting springs 38 may be utilized in cases where the driver is of excessive weight or where a weighty package is secured to the rear portion of the saddle. The up-turned hand grips 24 facilitate connecting packages with this portion of the saddle.

Normally the steps 50 are of insufficient length to provide foot rests for a tandem rider or passenger seated on the rear portion of the elongated saddle. We therefore provide auxiliary foot rests 51 which will preferably be bolted to the foot rests 50 in a rearwardly extending position, as clearly shown in Figure 1.

The specific mounting and the specific location of the auxiliary spring or springs as herein described and as shown in the drawing, together with their associated structural features and those of the saddle, are preferred embodiments of our invention, although these specific features of structure and location are not regarded as essential to the broad purpose of providing a saddle with a normally inoperative auxiliary resilient support.

We are informed that motorcycles have been equipped with a plurality of saddles in tandem relation to each other and each provided with saddle supporting springs. But such structures are more expensive and less satisfactory than our improved saddle structure, and where separate tandem saddles are employed, the extra saddle vibrates noisily when unoccupied and thus tends to cause rapid deterioration and crystallization of its springs. Such structures are also unsightly and have not been commercially successful.

We claim:

1. The combination with a motorcycle saddle and a resiliently mounted saddle supporting post, of auxiliary means for resiliently supporting the saddle, and a detent for normally holding said auxiliary supporting means in an inoperative position, and a manually operable coupling adapted to connect the auxiliary supporting means with the saddle when disengaged from the detent.

2. The combination with a motorcycle frame, saddle, and a resiliently mounted saddle supporting post, of an auxiliary saddle supporting member, manually operable coupling means for engaging and disengaging said spring from the saddle, and a holding member associated with the motorcycle frame normally holding said spring in an inoperative position in a substantially fixed non-rattling relation to the frame.

3. The combination with a motorcycle frame having a resiliently mounted saddle supporting post and saddle, of a mounting piece secured to the frame in the rear of the saddle post, a set of tension springs suspended from the end portions of the mounting piece, a yoke having side arms connected with and supported by said springs, and clamping means for connecting the yoke with the saddle at the rear side of its supporting post.

4. The combination with a motorcycle frame having a resiliently mounted saddle supporting post and saddle, of a mounting piece secured to the frame in the rear of the saddle post, a set of tension springs suspended from the end portions of the mounting piece, a yoke having side arms connected with and supported by said springs, clamping means for connecting the yoke with the saddle at the rear side of its supporting post, and a detent connected with the mounting piece and engageable with the yoke to hold it in fixed relation to the frame when disconnected from the saddle.

5. The combination with a motorcycle frame having a resiliently mounted saddle supporting post and saddle, of a mounting piece secured to the frame in the rear of the saddle post, a set of tension springs suspended from the end portions of the mounting piece, a yoke having side arms connected with and supported by said springs, clamping means for connecting the yoke with the saddle at the rear side of its supporting post, and a detent connected with the mounting piece and engageable with the yoke to hold it in fixed relation to the frame when disconnected from the saddle, said detent being adapted to hold the yoke supporting springs under increased tension when the yoke is connected therewith.

6. The combination with a motorcycle having a resiliently mounted saddle supporting post, of a saddle pivotally connected with said post and rearwardly extended therefrom to provide an auxiliary seat in the rear of the normal seat portion of the saddle, a mounting piece secured to the motorcycle in the rear of said post, and a normally inoperative auxiliary saddle supporting member having resilient connection with the mounting piece, an adjustable auxiliary saddle supporting member for temporarily connecting the auxiliary support with the saddle, and means for releasably connecting said devices in fixed relation to the frame when disengaged from the saddle.

7. A motorcycle provided with an elongated tandem saddle having hand grips at the sides of the rear portion thereof, means for normally resiliently supporting the central portion of the saddle and an auxiliary normally inoperative resilient support for the rear end portion of the saddle.

8. A motorcycle provided with an elongated tandem saddle having hand grips at the sides of the rear portion thereof, a resiliently mounted support for the central portion of the saddle, an auxiliary resilient support for the rear end portion of the saddle, and frame engaging connections for normally holding the auxiliary support in inoperative relation to the saddle.

9. The combintion with a motorcycle frame, of a motorcycle saddle having a pillar bar pivoted to the frame at its front end, a resiliently mounted post pivoted to the pillar at an intermediate point, a cross bar provided with manually releasable rearwardly extending clamping members, and a resiliently mounted yoke pivotally supported from the frame and adapted to be swung into position for engagement with said clamping members.

10. The combination with a motorcycle frame, of an elongated unitary saddle having a pillar bar pivoted to the frame at one end intermediately spring supported, and having at its other end means for manually detachable coupling engagement with auxiliary spring supports, said saddle extending from the first mentioned pivotal connection to a point sufficiently in the rear of the spring support to receive riders at the front and rear of said support, or a single rider on the portion thereof directly above said support; and a reinforcing cross bar for the rear end portion of the saddle provided with upwardly offset end portions adapted to serve as hand grips for a passenger seated at the rear of the driver.

11. The combination with a motorcycle frame, of a saddle having its central portion resiliently supported from said frame, a mounting secured to the frame in the rear of said saddle support, and an auxiliary resilient support pivotally connected with the mounting and adapted to be swung either into supporting relation to the saddle, or into fixed relation with the frame, whereby said support may be normally held in fixed relation to the frame and connected in supporting relation to the saddle when the latter is overloaded.

12. The combination with a motorcycle having a resiliently mounted saddle supporting post, of a saddle pivotally connected with said post and rearwardly extended therefrom to provide an auxiliary seat in the rear of the normal seat portion of the saddle, hand grips at the sides of said rearwardly extended portion of the saddle, a mounting piece secured to the motorcycle in the rear of said post, a normally inoperative auxiliary saddle supporting member having resilient connection with the mounting piece, means for detachably connecting the auxiliary saddle supporting member with the saddle, and means for fixedly connecting said member with the frame in non-rattling relation thereto when said member is disengaged from the saddle.

13. A motorcycle provided with an elongated tandem saddle having a forward portion adapted to serve as a support for the operator, depending coupling members at the front and rear ends of said portion adapted to connect it respectively with the motor cycle frame and with a seat supporting post, said saddle having a passenger supporting portion extending rearwardly from the post engaging coupling member and provided with laterally and upwardly extending hand grips.

14. The combination with a motorcycle frame, of an elongated saddle pivoted to the frame at the front end and having its central portion resiliently supported from said frame, a mounting piece secured to the frame at the rear of said resilient support, and a resiliently yielding auxiliary saddle support carried by said mounting piece in a normally inoperative position, said support and the rear portion of said saddle being provided with mutually engageable coupling connections adapted to connect the auxiliary saddle support with the rear portion of the saddle when the auxiliary support is adjusted from its normally inoperative position to a saddle supporting position.

15. The combination with the upper rear fork of a motorcycle frame, of a mounting piece secured to said frame fork, a resilient saddle support carried by said mounting piece, manually releasable means for holding said support in a normally inoperative position in substantially fixed relation to the rear fork, and means for coupling said saddle support to the rear portion of a saddle when released from said holding means.

16. The combination with a motorcycle frame having a pillar bar pivoted to the frame at one end, a resiliently mounted saddle supporting post carried by the frame and pivotally connected with an intermediate portion of the pillar bar, an auxiliary resilient support for the rear portion of the saddle, manually releasable means for normally holding said auxiliary support under tension in an inoperative position of disengagement from the pillar bar, and manually adjustable coupling means for connecting the auxiliary support with the pillar bar in supporting relation to the rear end of the saddle when said auxiliary support is released from its normally inoperative position.

WILLIAM S. HARLEY.
FRANK W. TRISPEL.